(12) United States Patent
Jones et al.

(10) Patent No.: US 7,735,917 B2
(45) Date of Patent: Jun. 15, 2010

(54) VEHICLE SEAT SYSTEM

(75) Inventors: Davey J. Jones, Lenoir City, TN (US); William D. Ruth, Lenoir City, TN (US); David Lyscas, Maryville, TN (US)

(73) Assignee: CVG Management Corporation, New Albany, OH (US)

( * ) Notice: Subject to any disclaimer, the term of this patent is extended or adjusted under 35 U.S.C. 154(b) by 0 days.

(21) Appl. No.: 12/411,079

(22) Filed: Mar. 25, 2009

(65) Prior Publication Data

US 2009/0184545 A1 Jul. 23, 2009

Related U.S. Application Data

(62) Division of application No. 11/263,763, filed on Oct. 31, 2005, now Pat. No. 7,510,240.

(51) Int. Cl.
*B60N 2/42* (2006.01)
*A47C 1/00* (2006.01)

(52) U.S. Cl. .............................. 297/216.1; 297/344.18

(58) Field of Classification Search ............. 297/216.1, 297/216.16, 216.17, 216.19, 216.2, 344.18, 297/423, 188.5, 407
See application file for complete search history.

(56) References Cited

U.S. PATENT DOCUMENTS

| | | | | | |
|---|---|---|---|---|---|
| 2,916,081 | A | * | 12/1959 | Pinkel | .................... 297/216.19 |
| 3,452,834 | A | * | 7/1969 | Gaut | ........................... 180/271 |
| 4,238,135 | A | * | 12/1980 | Sandham | ..................... 297/468 |
| 4,889,389 | A | * | 12/1989 | White et al. | ................. 297/468 |
| 5,642,916 | A | * | 7/1997 | Dybro et al. | ........... 297/216.18 |
| 6,481,777 | B2 | * | 11/2002 | Mans | ......................... 296/68.1 |

* cited by examiner

*Primary Examiner*—Milton Nelson, Jr.
(74) *Attorney, Agent, or Firm*—Gallagher & Dawsey Co., LPA; Michael J. Gallagher; David J. Dawsey (57) ABSTRACT

A vehicle seating system in which a seat belt restraint assembly may be secured directly to the seat. The vehicle seating system includes generally a seat and a base assembly that supports the seat. The base assembly may be a suspension base assembly or a pedestal base assembly. The construction of the base assembly provides the vehicle seating system with sufficient strength so that the system satisfies load testing requirements and provides comfort to the occupant. The base assembly includes a stop operating at the forward portions of the base assembly to limit forward pivoting movement of the seat upon sudden deceleration. The suspension base assembly may also include dual thickness arms, internal tethers, and vertical supports at the rear of the assembly to strengthen the assembly. The pedestal base assembly may also include telescoped tubes to strengthen the assembly.

21 Claims, 9 Drawing Sheets

VEHICLE SEAT SYSTEM

CROSS-REFERENCE TO RELATED APPLICATIONS

This application is a divisional application of U.S. patent application Ser. No. 11/263,763, filed on Oct. 31, 2005, now U.S. Pat. No. 7,510,240, issued on Mar. 31, 2009, the contents of which are incorporated by reference as if completely written herein.

FIELD OF THE INVENTION

This invention relates to a vehicle seating system, and more particularly, to a vehicle seating system with enhanced structural features to accommodate a seat belt restraint system carried by the seat frame.

BACKGROUND OF THE INVENTION

The conventional seat belt restraint system includes a shoulder portion and a lap portion. One end of the shoulder portion is commonly attached to the frame of the vehicle at a location adjacent the occupant's shoulder. This is true, for example, with respect to buses and bus driver seats. By attaching the shoulder belt to the vehicle body, the vehicle body, rather than the vehicle seat, absorbs a relatively significant portion of the loads to which the occupant is exposed during a sudden deceleration of the vehicle.

The seats and seat belt assemblies must comply with the Federal Motor Vehicle Safety Standards (FMVSS). These standards have been developed to help minimize the possibility of the failure of seat and restraint designs by the forces acting on them as a result of a sudden deceleration or vehicle impact. For example, FMVSS 571.210 currently requires a seat and seat belt assembly for many vehicles to withstand forces in excess of 3,000 pounds applied to the shoulder belt and lap belt portions of the seat belt. Further, FMVSS 571.222 establishes occupant protection requirements for school bus passenger seating and restraining barriers, and SAE J2287 addresses design and performance standards for seats with integrated lap and shoulder restraints.

It would be desirable to attach the upper end of the shoulder belt to the frame of the seat, instead of to the frame of the vehicle. This position would render the shoulder belt more comfortable to the occupant and would facilitate the installation of the seat and the accompanying belts within a vehicle. The shoulder belt would not tend to chafe the neck of the occupant, as may arise when the seat belt is attached to the frame of the vehicle, due to such factors as the height of the occupant, the unevenness of the road, or whether the individual desires to recline in the seat. These considerations make wearing of a seat belt uncomfortable.

However, loading tests to which vehicle seats are commonly subjected require that a frame of the seat be much stronger when a shoulder belt is attached to the seat frame than is the case when the shoulder belt is attached to the vehicle body. Previous efforts to render the seat frame stronger have resulted in designs that are too bulky, heavy, or costly to be practical from a manufacturing standpoint. Further, previous efforts have focused on making the seat itself stronger, rather than the seat base assembly that supports the seat.

Thus, it is desirable to design a lightweight vehicle seating system, including seat base assembly, that allows a restraint assembly to be attached to the vehicle seating system itself.

DESCRIPTION OF THE PREFERRED EMBODIMENTS

The present invention relates generally to a vehicle seating system (1) in which a seat belt restraint assembly may be secured directly to the seat (60) and not the vehicle. The vehicle seating system includes (1) generally a base assembly (2) and a seat (60). The base assembly (2) supports the seat (60) for movement relative to the floor of the vehicle along a generally vertical path. The seat (60) includes a substantially horizontally disposed bottom portion (62) upon which a seat cushion (68) is secured and a backrest portion (64) to which a back cushion (70) is secured. The seat (60) is mounted on the base assembly (2), which is, in turn, secured to the floor of the vehicle. The construction of the base assembly (2) and seat (60) provides the vehicle seating system (1) with sufficient strength so that the system (1) satisfies FMVSS load testing requirements and provides comfort to the occupant. One way that the system (1) satisfies the FMVSS requirements is through use of a stop operating at the forward portions of the base assembly (2) to limit pivoting movement of the seat (60) upon sudden deceleration.

The vehicle seating system (1) includes a seat (60) mounted to either a suspension base (3) (FIGS. 1-5) or a pedestal base (40) (FIGS. 6-7), which base is anchored to the vehicle floor. The vehicle seating system (1) has a lightweight construction and may include a reclining assembly for maintaining the seat backrest portion (64) in one of a variety of reclined positions. The restraint assembly, a conventional restraint assembly with a continuous lap and shoulder belt, is directly secured to the seat (60) at both of its ends.

A suspension base assembly (3) is illustrated in FIGS. 1-5. The suspension base assembly (3) is interposed between the seat (60) and the vehicle floor to accommodate movement of the seat (60) relative to the floor between raised and lowered positions. To this end, the suspension base assembly (3) includes a lower base frame (4) which is securable to the floor in a stationary relationship therewith and an upper base frame (10) upon which the seat (60) is mounted. As seen in FIGS. 1-5, the upper base frame (10) has a generally rectangular shape when viewed from above, and the lower base frame (4) has members cooperating to form a six sided rectangular frame box with open walls. Pivotally connected between the upper and lower base frames (4, 10) are two arm assemblies (20). As the seat (60) is raised or lowered with respect to the vehicle floor, the upper base frame (10) is raised or lowered with respect to the lower base frame (4), as the arm assemblies (20) are permitted to pivot relative to the upper and lower base frames (4, 10).

The suspension system includes an air spring (16) and two double ended vibration dampers (18) for dampening vertical oscillations of the seat (60) as the vehicle is operated. The embodiment illustrated herein shows two dampers (18), but in other embodiments, only one damper is preferably used. The air spring (16) is secured between portions (17, 21) of the upper and lower base frames (10, 4), respectively. If desired, the air spring (16) could be replaced by some other sort of conventional mechanical suspension. Two double ended dampers (18), or shock absorber type devices, are each pinned at one end to a portion of the upper base frame (10). The remaining free ends of the dampers are each pinned to the lower base frame (4). The air spring (16) is located in the general center of the upper and lower base frames (10, 4). The dampers are located on opposite sides of the air spring (16). The arm assemblies (20), the dampers (18), and the air spring (16) cooperate to provide a suspension system for the seat (60).

Figure 3:
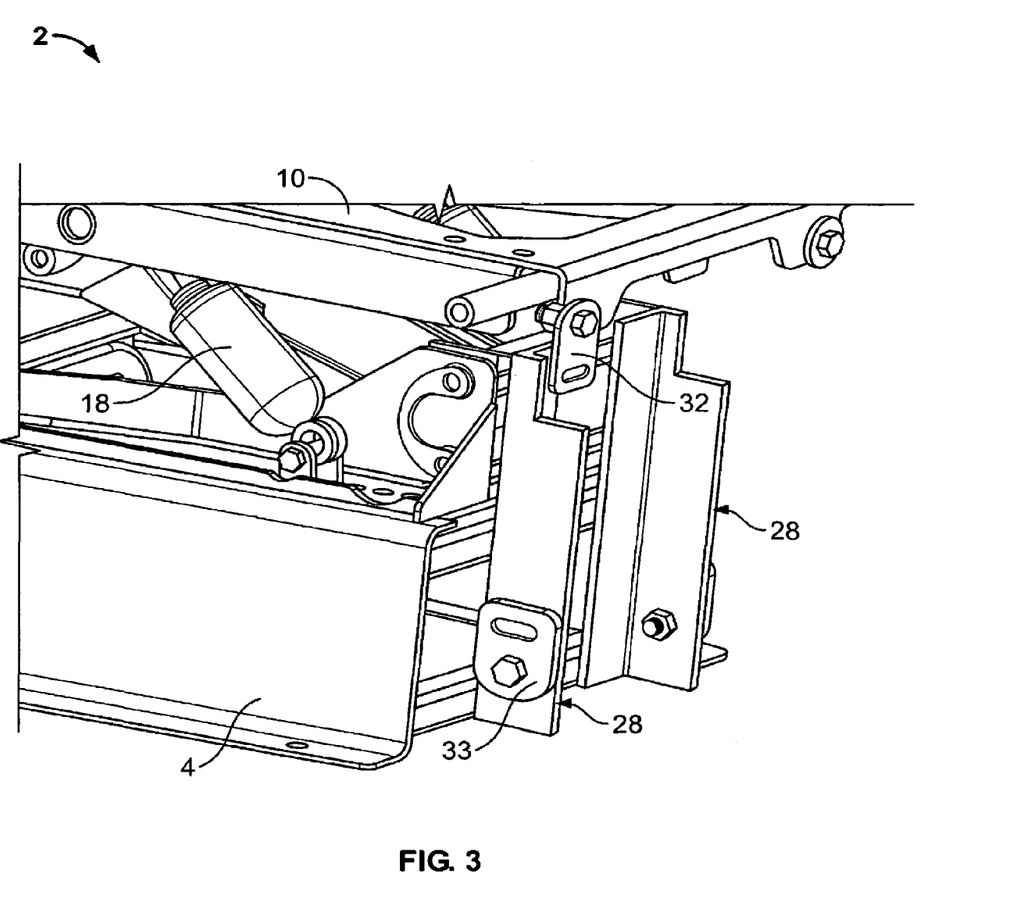
FIGS. 3-5 are partial perspective views of the seat base assembly shown in FIG. 1.
Figure 4:
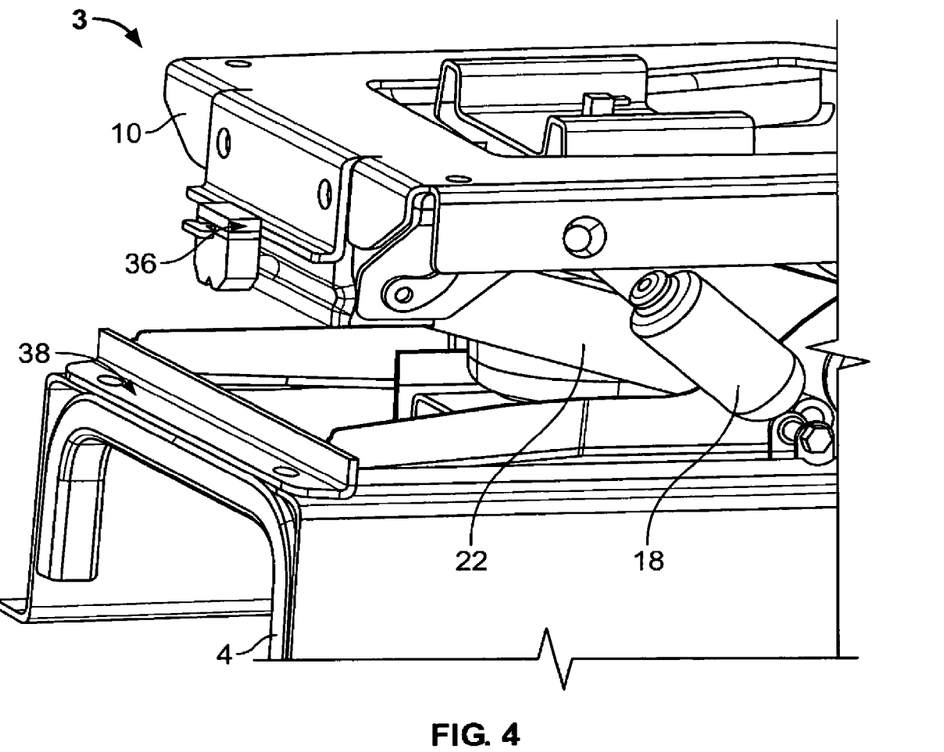
Figure 5:
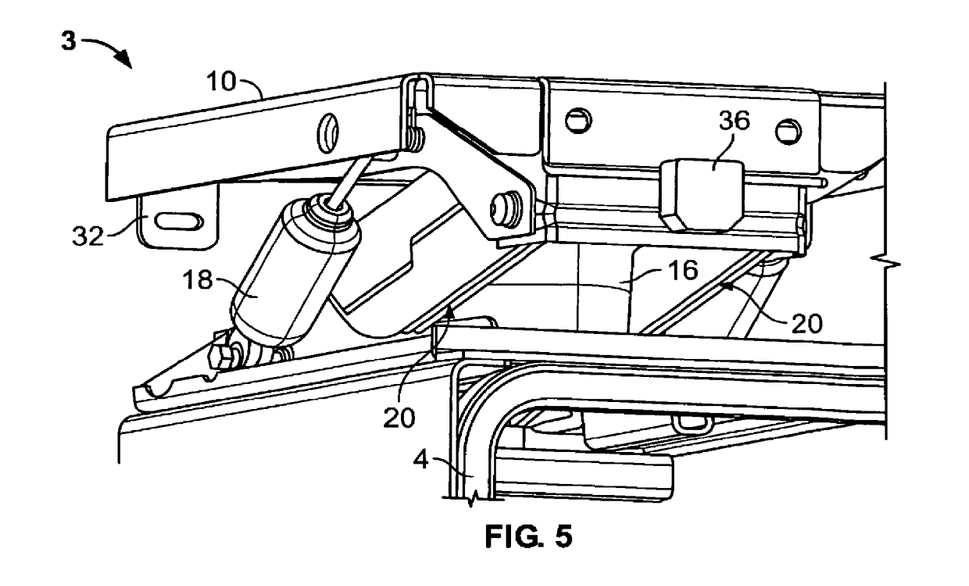

As shown in FIGS. 3-5, the arm assemblies (20) provide a linking system for interconnecting the lower base frame (4) and the upper base frame (10). As can be seen in FIGS. 3-5, the arm assemblies (20) cooperate such that the upper base frame (10) can be shifted vertically up and down with respect to the lower base frame (4). Each arm assembly (20) preferably includes two steel elongated arms (22) that are rigidly secured to one another, such as by welding. The arm assemblies (20) are preferably of increased thickness, such as double thickness, to increase the sturdiness of the suspension base assembly (3).

Figure 1:
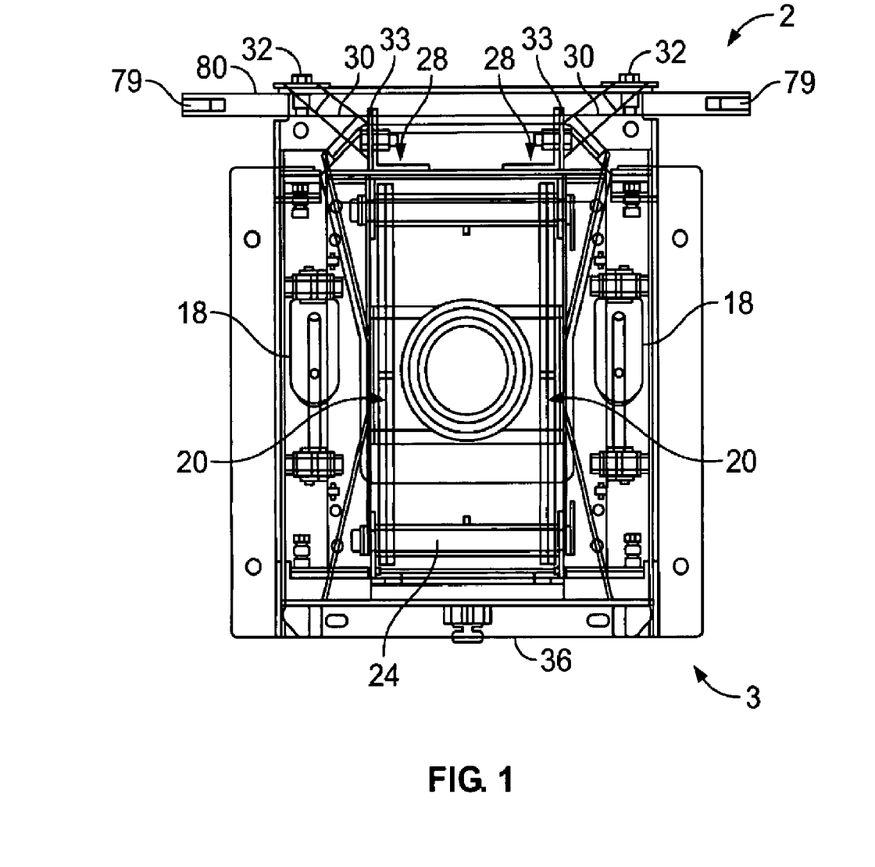
FIG. 1 is a top schematic view of a first embodiment of a seat base assembly of the present invention.

As shown in FIGS. 1 and 5, the arm assemblies (20) are substantially parallel to one another. The forward ends (23) of the arm assemblies (20) are preferably secured to one another at the front of the upper base frame (10) by two pivot pins (24). Also, the rearward ends (25) of the arm assemblies are preferably secured to one another at the rear of the lower base frame (4) by two pivot pins (24). Preferably, each pivot pin (24) is constructed of a high strength steel to resist shear forces to which the pin (24) may be exposed.

The suspension base assembly (3) includes a stop to limit forward pivoting movement of the seat (60) upon sudden deceleration. More specifically, as shown in FIGS. 1, 2, 4, and 5, the suspension base assembly (3) preferably includes a bumper (36) at the front of the upper base frame (10). The bumper (36) is preferably rectangular or square in shape and preferably has a rubber outer surface surrounding a steel core. The bumper (36) acts when the upper base frame (10) moves forwardly and downwardly upon sudden deceleration. Under such circumstances, it impacts a stop surface (38) on the lower base frame (4) and thereby prevents further forwarding pivoting movement by the upper base frame (10) in a forward and downward direction. As seen in FIG. 4, the stop surface (38) is preferably a steel angle located at the top front portion of the lower base frame (4). The bumper (36) and stop surface (38) act in conjunction as the stop for the suspension base assembly (3). The distance between the bumper (36) and stop surface (38) in the normal static conditions is coordinated with the suspension system to allow the desired freedom of vertical movement, such as up to four inches, without interference when the vehicle seat system (1) is operating in a normal condition.

Figure 2:
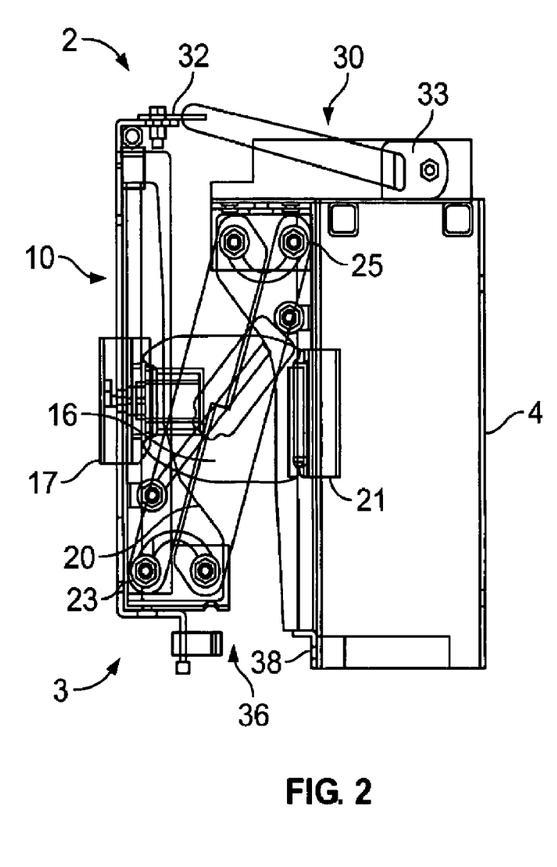
FIG. 2 is a side schematic view of the seat base assembly shown in FIG. 1.

Further, as shown in FIGS. 1-3, two vertical supports (28) are located at the rear of the suspension base assembly (3). The two vertical supports (28) are preferably L-shaped in cross section. As seen in FIGS. 2 and 3, they are secured, as by welding, to the rear of the lower base frame (4) and preferably connected to the pivot pins (24). The vertical supports (28) act in conjunction with internal tethers (30), discussed below, to strengthen the structural integrity of the lower base frame (4). This then cooperates with the forward stop to limit the motion of the upper base frame (10) and to prevent the upper base frame (10) from "diving," i.e., forward pivots during a sudden deceleration above a desirable level.

As shown in FIGS. 1 and 2, the suspension base assembly (3) includes one or more, and preferably two, internal tethers (30) located at the rear of the assembly (3). The internal tethers (30) each extend between openings in a first bracket (32) secured to each side of the rear of the upper base frame (10) and a second bracket (33) secured to each of the vertical supports (28). The internal tethers (30) are preferably composed of a fabric-like, standard seat belt material.

Figure 6:
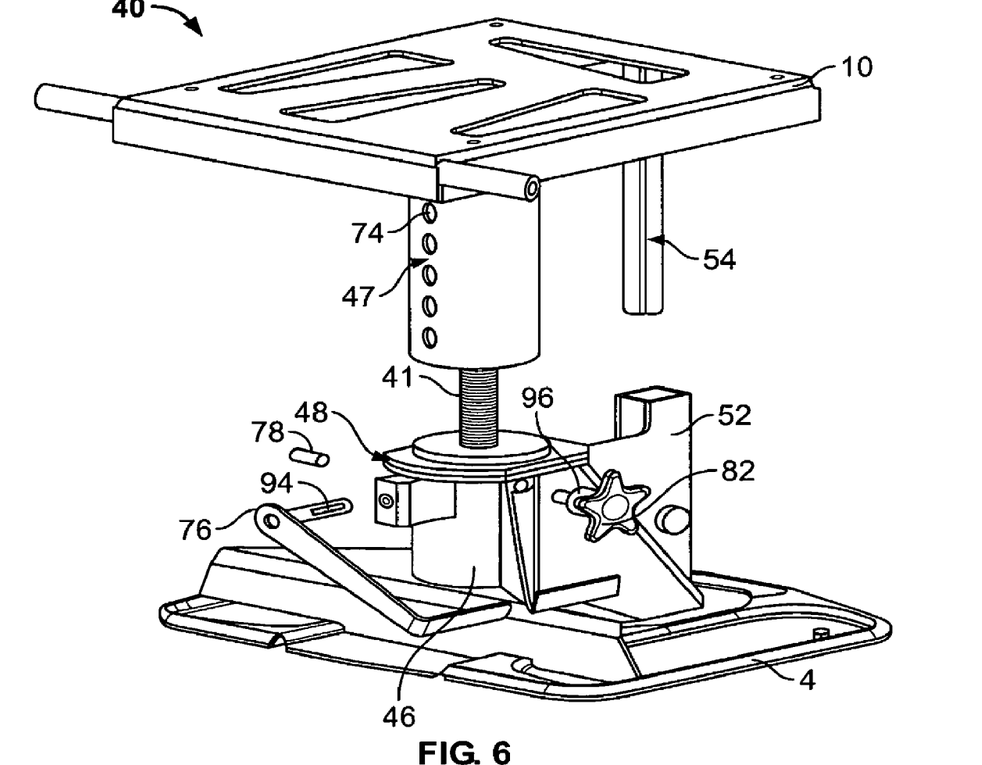
FIG. 6 is a perspective view of a second embodiment of a seat base assembly of the present invention in which the seat base assembly is partially disassembled.
Figure 7:
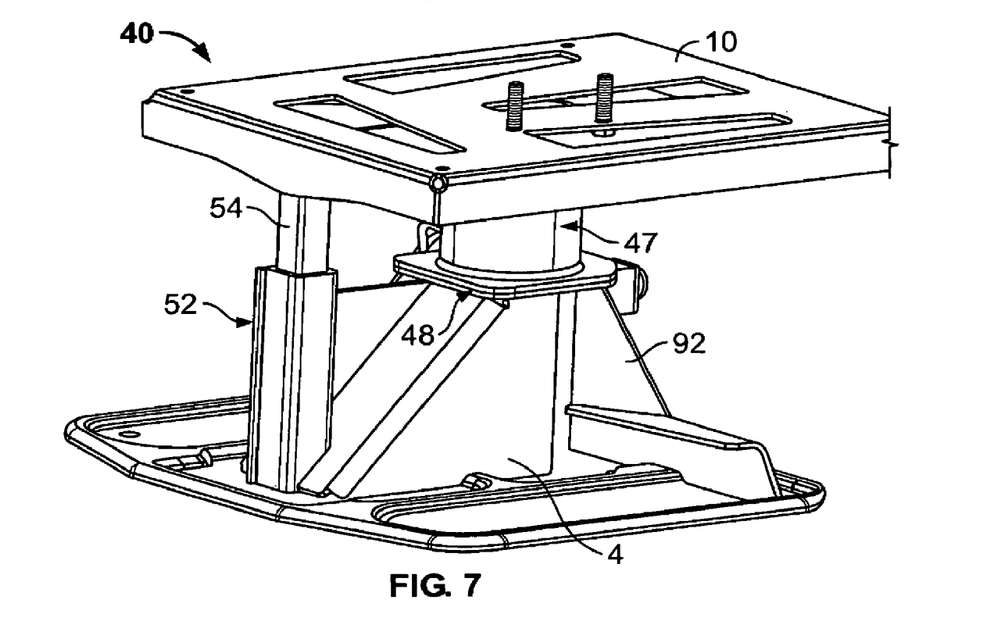
FIG. 7 is a perspective view of the seat base assembly shown in FIG. 6.

A second embodiment of the present invention uses a pedestal base assembly (40), which is illustrated in FIGS. 6-7. The pedestal base assembly (40) includes a lower base frame (4) which is securable to the floor in a stationary relationship therewith and an upper base frame (10) upon which the seat (60) is mounted. More specifically, the bottom portion (62) of a seat (60) is mounted to seat tracks (not shown), which are, in turn, mounted to the upper base frame (10).

As can be seen in FIG. 6, the upper base frame (10) is mounted to two telescopically-engaged sleeve tubes (46) and (47). A first sleeve tube (46), preferably having a circular cross-section, has a larger diameter than, and telescopically engages, a second sleeve tube (47), also preferably having a circular cross-section. The circular cross-section adds strength to the design.

The first sleeve tube (46) is secured to, and extends upwardly from, the lower base frame (4), which is secured to the vehicle floor. The second sleeve tube (47) is secured to, and extends downwardly from, the upper base frame (10) and preferably has thicker walls than the first sleeve tube (46). In contrast to the second sleeve tube (47), the first sleeve tube (46) has a relatively low center of gravity and is supported by generally triangular webs (92) that extend between the floor and the tube (46). The thicker walls help provide the second sleeve tube (47) with sufficient support. During operation of the vehicle, the second sleeve tube (47) is nested within the first sleeve tube (46) and thereby engages the first sleeve tube (46) to limit pivoting movement of the seat (60) in a forwardly and downwardly direction upon sudden deceleration of the vehicle.

The first and second sleeve tubes (46, 47) therefore cooperate in a manner to strengthen the pedestal base assembly (40) and limit pivoting movement of the seat (60). The assembly (40) is further strengthened by the use of multiple collars (48) that reinforce the strength of the telescopically-engaged first and second sleeve tubes (46, 47). As shown in FIGS. 6 and 7, the collars (48) are disposed about the top end of, and about the outside diameter of, the first sleeve tube (46). The collars (48) reinforce the top end of the first sleeve tube (46) and prevent deformation.

The second sleeve tube (47) is selectively movable with respect to the first sleeve tube (46) between various vertical positions to raise and lower the upper base frame (10) and to thereby operate as part of a height adjustment mechanism. As shown in FIG. 6, the second sleeve tube includes a series of vertically aligned holes (74) to serve as variable height adjustment settings. A first spring (41) is disposed between the lower base frame (4) and the upper base frame (10) within and extends through the first sleeve tube (46). The first spring (41) acts upwardly against the upper base frame (10) and thereby biases the first and second sleeve tubes (46, 47) apart from one another.

The occupant operates a lever (76) to selectively adjust the vertical height of the seat (60) between the various settings defined by the holes (74) in the second sleeve tube (47). The lever (76) controls the movement of a first pin (94) on the end of lever (76) that is moveable to interconnect the first and second sleeve tubes (46, 47) via the alignment of holes in the tubes (46, 47), thereby allowing the first pin (94) to extend therethrough. The first pin (94) is received within one of the holes (74) of the second sleeve tube (47) to set the pedestal base assembly (40) to a specific height.

When the occupant desires to raise or lower the seat (60), the occupant operates the lever (76) causing a second pin (78) to move downward and laterally, thereby causing the first pin (94) to disengage. When the first pin (94) interconnecting the first and second sleeve tubes (46, 47) is removed, the first spring (41) urges the first and second sleeves (46, 47) apart, and the first and second sleeves (46, 47) are moveable with respect to one another to select a new vertical setting. The first spring (41) acts to raise the upper base frame (10) to a higher vertical setting, whereas the occupant must push the frame (10) down to overcome the bias of the first spring (41) to lower the frame (10). When the correct setting is achieved, the first pin (94) may be repositioned to interconnect the first and second sleeve tubes (46, 47) and to prevent further movement with respect to one another. The first pin (94) may be biased inward through the aligned holes by a second spring to control movement of the first pin (94).

The vertical height adjustment mechanism also preferably includes an adjustable knob (82) that moves a set pin (96), which engages the lower end of second sleeve tube (47) and stabilizes the second sleeve tube (47). The set pin (96) threadingly extends to the second sleeve tube (47). Once the seat (60) is set to its desired height and the first pin (94) is secured, the adjustable knob (82) is turned clockwise to move the set pin (96) into secure contact with the lower end of the second sleeve tube (47).

The pedestal base assembly (40) employs a stop, located in front of the first and second sleeve tubes (46, 47), to limit the forward pivoting movement of the assembly (40) upon sudden deceleration of the vehicle. The stop includes a second set of tubes, referred to herein as deceleration tubes, that telescopically engage one another. As shown in FIGS. 6 and 7, the first deceleration tube (52) is secured to, and extends upwardly from, the lower base frame (4), which is secured to the vehicle floor. The second deceleration tube (54) is secured to, and extends downwardly from, the upper base frame (10). The first and second deceleration tubes (52, 54) are preferably square in cross-section with the second deceleration tube (54) having a smaller cross-sectional area to be telescopically received in the first deceleration tube (52). More specifically, during operation of the vehicle, the second deceleration tube (54) is nested within the first deceleration tube (52) and thereby engages and binds on the first deceleration tube (52) to limit forward pivoting movement of the seat (60) upon sudden deceleration of the vehicle.

When the height is adjusted upward or downward, the first and second deceleration tubes (52, 54) move freely with respect to one another. When the height of the seat (60) is adjusted upward, the second deceleration tube (54) also moves upward, thereby leaving less of the second tube (54) nested within the first tube (52). Conversely, when the height of the seat (60) is adjusted downward, the second deceleration tube moves downward, thereby increasing the amount of the second tube (54) nested within the first tube (52). At all times following installation, a sufficient amount, preferably at least 2.2 inches, of the second tube (54) telescopically engages inside the first tube (52). During ordinary acceleration or deceleration, there is little, if any, binding contact between the first and second tubes (52, 54). Upon sudden deceleration, however, the first and second tubes (52, 54) "bind," i.e., frictionally engage one another, thereby acting as a stop and limiting the forward and downward pivoting movement by the pedestal base assembly (40).

Another advantage of both the suspension base assembly (3) and the pedestal base assembly (40) is that both are able to accommodate features of existing vehicles, particularly buses. More specially, the vehicle seating system (1) is able to work with existing external tether locations in the floors of buses. An external tether (not shown) may be attached to outside portions (79) of a belt bar (80) located at the rear of both the suspension base assembly (3) and the pedestal base assembly (40), as shown in FIGS. 1, 3, and 6. The external tether extends from the outside portions (79) of the belt bar (80) to the floor bolt of a vehicle. In the present vehicle seating system (1), the floor bolt can be located nearly directly beneath the outer portions (79) of the belt bar (80). Other designs require floor bolt locations that are behind the vehicle seat system.

Another advantage resulting from the increased sturdiness of both the suspension base assembly (3) and the pedestal base assembly is the increased height adjustment available, in comparison to other belt-to-seat designs. Because the base assembly (2) has a stop and other features that limit pivoting of the vehicle seat system (1), the vehicle seat system may be adjusted through a vertical height adjustment of about four inches. Other belt-to-seat designs do not provide this expanded vertical height adjustment.

In addition, the use of the stop and other features allow the vehicle seating system (1) to resist sudden deceleration forces while remaining relatively lightweight. The weight of the vehicle seat system (1) employing the pedestal base assembly (40) may be as light as about 107 pounds, while the weight of the vehicle seat system (1) employing the suspension base assembly (3) may be as light as 125 pounds.

Figure 8:
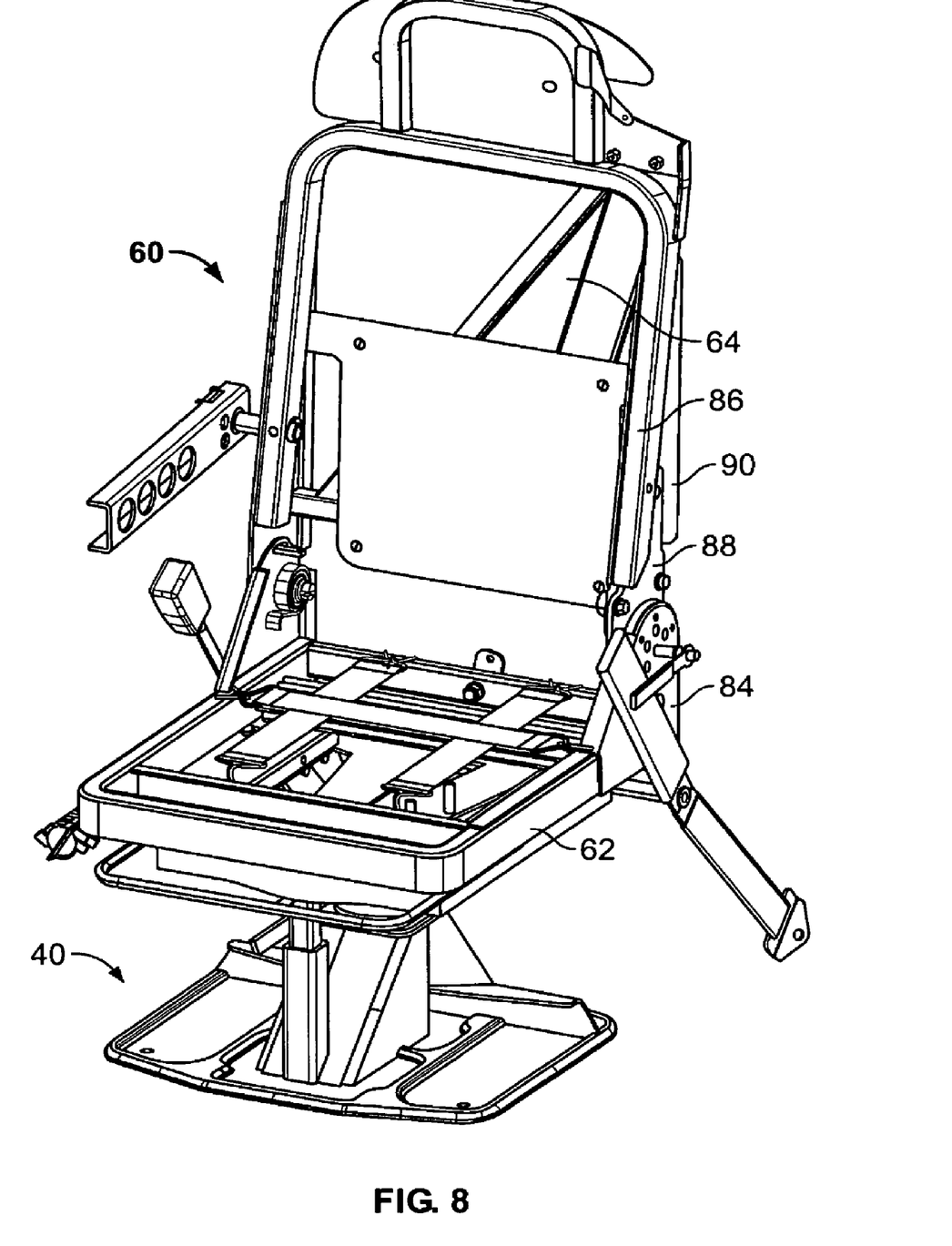
FIG. 8 is a perspective view of an embodiment of the seat of the present invention.
Figure 9:
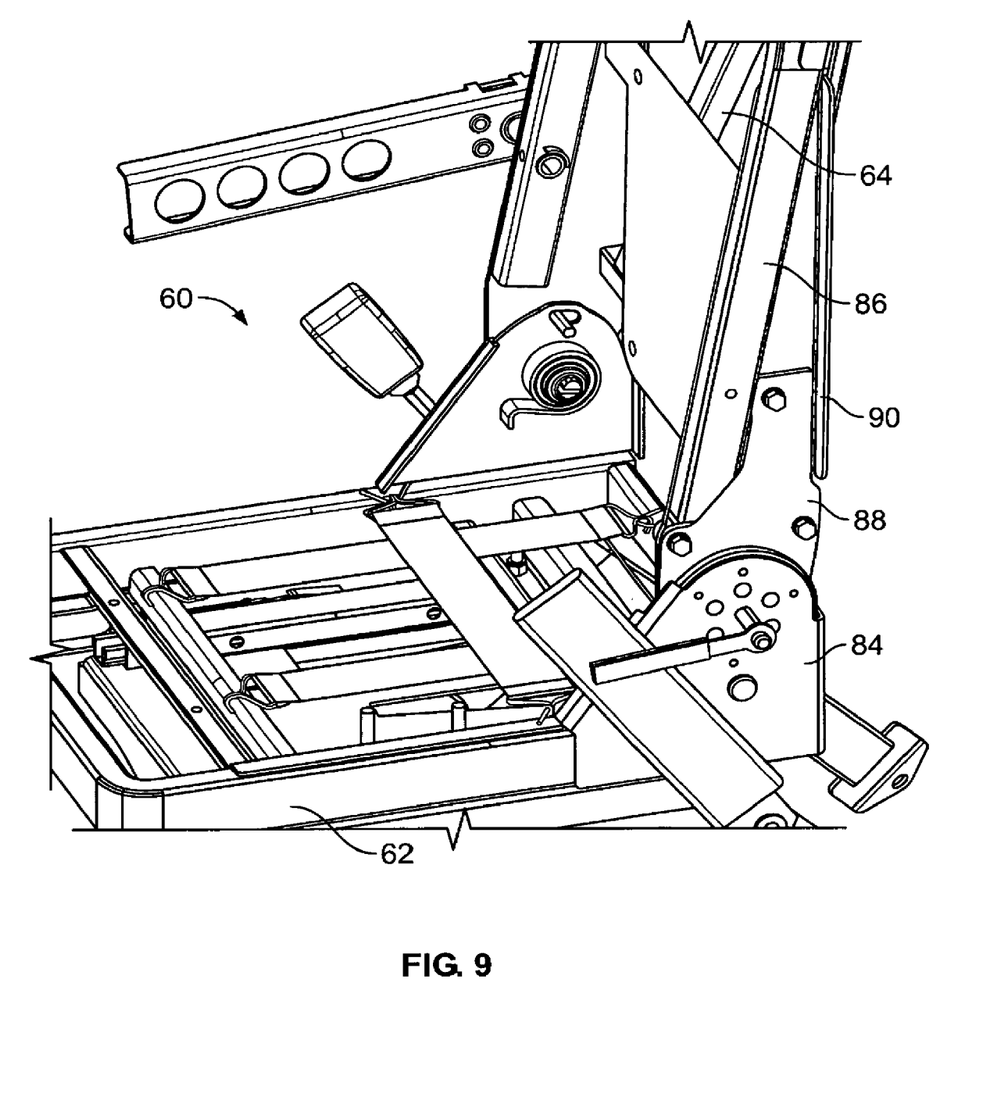
FIG. 9 is a perspective view of the seat of FIG. 8.

As shown in FIGS. 8 and 9, the seat (60) preferably includes a recliner assembly (84) for maintaining backrest portion (64) of the seat (60) in one of a variety of reclined positions. The recliner assembly (84) joins the backrest portion (64) of the seat (60) to the bottom portion (62) in a selectively rotatable manner. The recliner assembly (84) allows the backrest portion (64) to selectively rotate between an upright position and a fully reclined position. The backrest portion (64) rotates about 17 degrees to its fully reclined position.

The seat (60) has been strengthened sufficiently to make it capable of withstanding the loads associated with securing the seat belt to the seat (60), rather than the frame of the vehicle. As shown in FIG. 8, the backrest portion (64) of the seat (60) includes an inverted U-shaped tubular frame (86) that extends about, and defines at least a portion of, the front of the backrest portion (64). A bracket (88) has been mounted adjacent to one end of the tubular frame (86) and sandwiched between the recliner assembly (84) and an elongated backrest reinforcement member (90). As shown in FIGS. 8 and 9, the plate (90) has a generally L-shaped cross-section extends behind the bracket (88), and has a non-L-shaped tail portion that extends downward and is bolted to the bracket (88). The nesting of these components in this manner provides the seat (60) with extra strength and enhances the ability of the seat (60) to withstand the loads arising from sudden deceleration.

Figure 10:
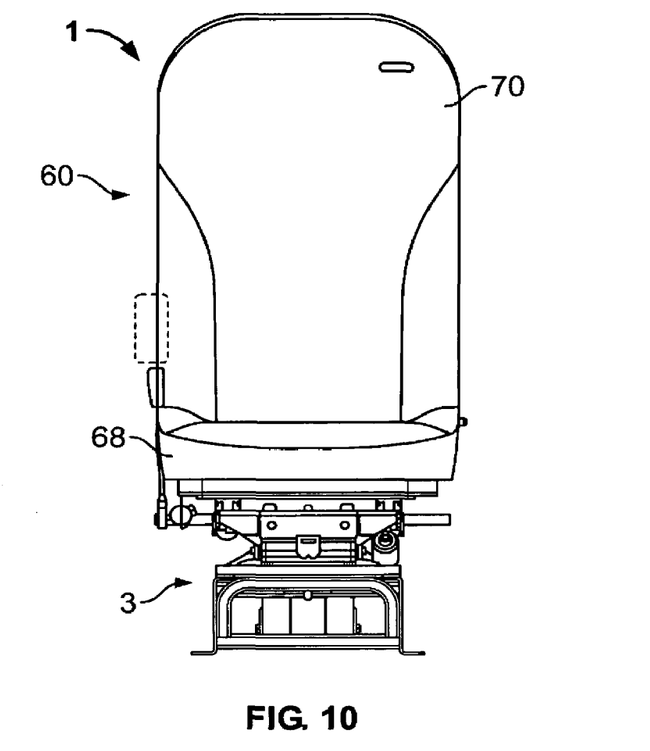
FIG. 10 is a front schematic view of an embodiment of a vehicle seat system of the present invention with the seat base assembly of FIG. 1.
Figure 11:
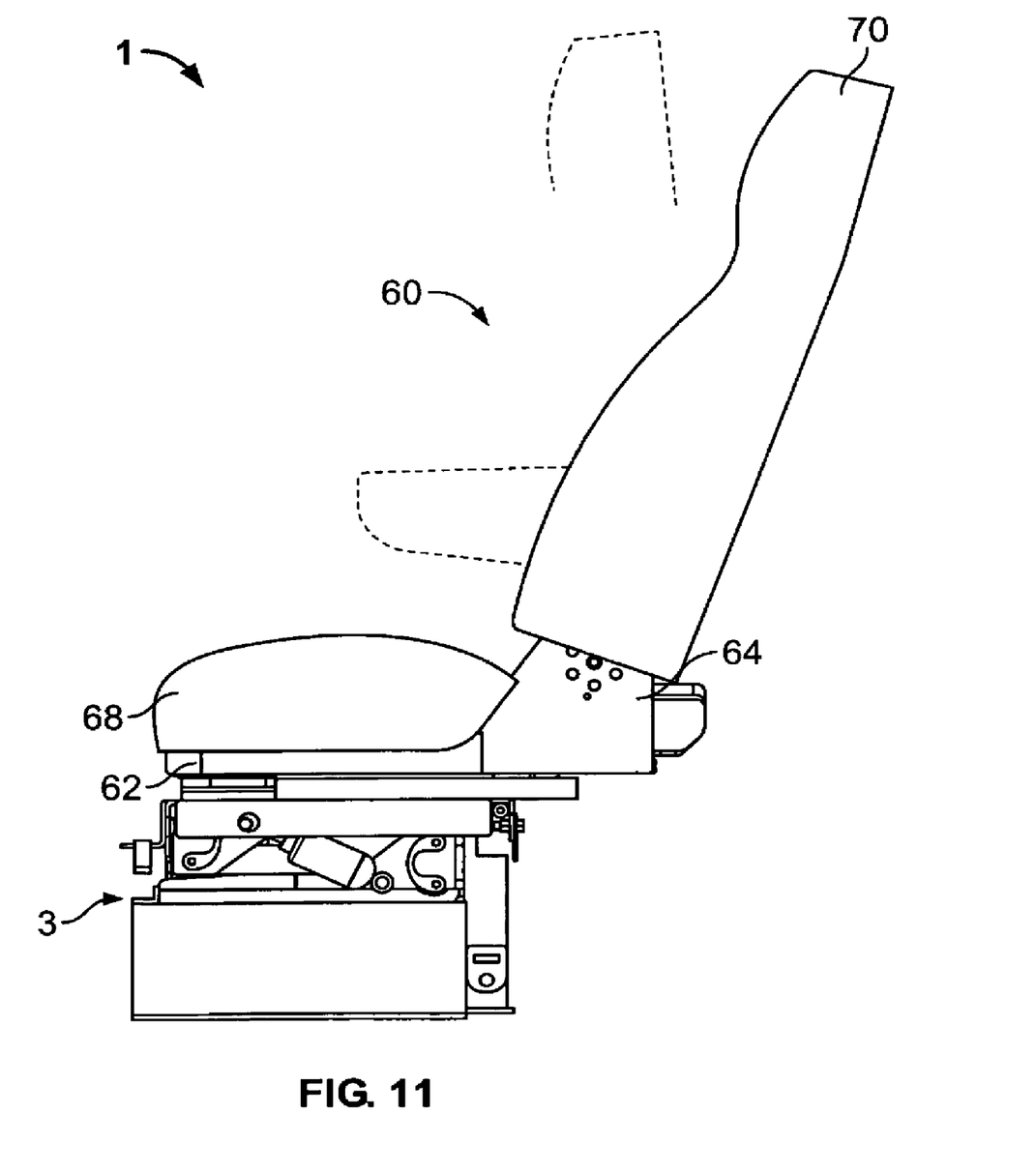
FIG. 11 is a side schematic view of the vehicle seat system of FIG. 10.
Figure 12:
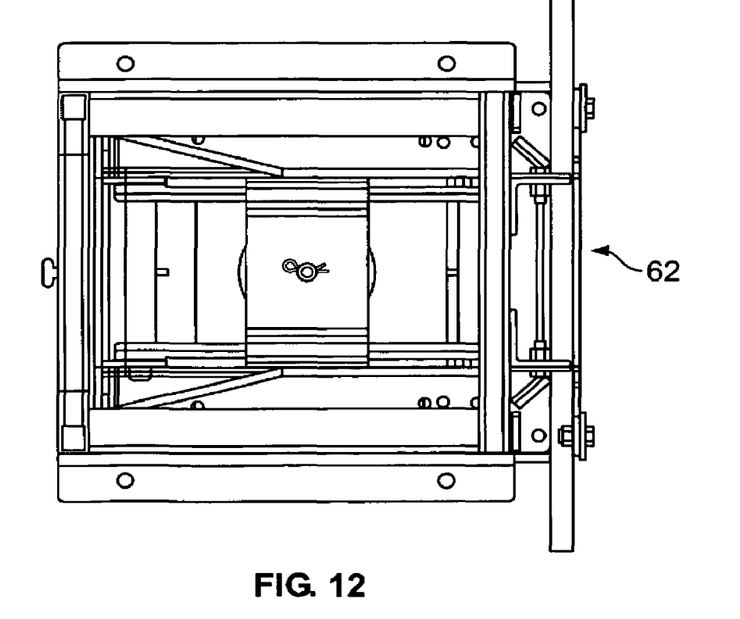
FIG. 12 is a bottom schematic view of the bottom seat portion of the vehicle seat system of FIG. 10.
Figure 13:
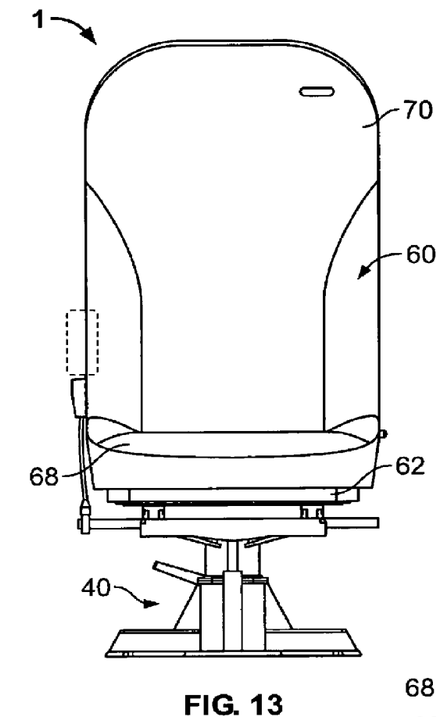
FIG. 13 is a front schematic view of an embodiment of a vehicle seat system of the present invention with the seat base assembly of FIG. 6.
Figure 14:
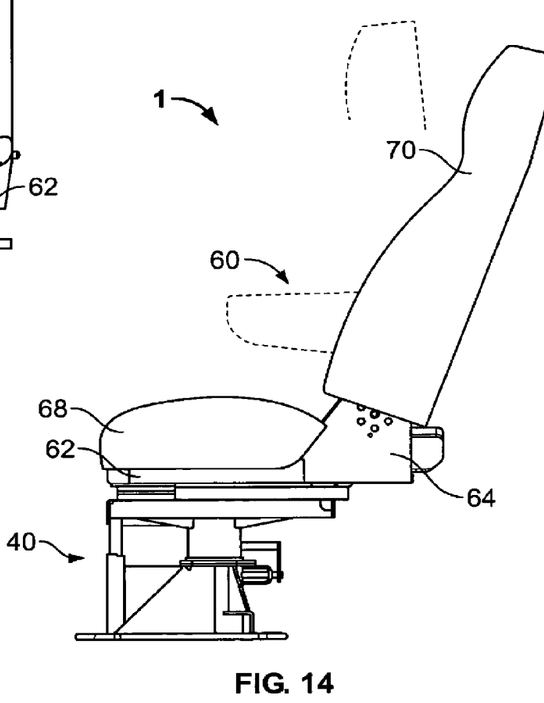
FIG. 14 is a side schematic view of an embodiment of the vehicle seat system shown in FIG. 13.
Figure 15:
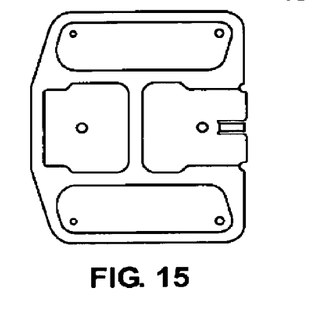
FIG. 15 is a bottom schematic view of the bottom seat portion of the vehicle seat system of FIG. 13.

Two embodiments of the vehicle seat system (1), and features thereof, are shown in FIGS. 10-15. FIGS. 10-12 show a first embodiment of the vehicle seating system (1) having the suspension base assembly (3) described above. FIGS. 13-15 show a second embodiment of the vehicle seating system (1) having the pedestal base assembly (40) described above.

As shown in FIGS. 10-15, the seat (60) of the vehicle seating system (1) includes the bottom portion (62), the backrest portion (64), the seat cushion (68), and the back cushion (70). The seat cushion (68) and the backrest cushions (70) are affixed to the bottom portion (62) and backrest portion (64) in a conventional manner. The vehicle seating system (1) preferably employs a conventional seat belt restraint assembly having shoulder, lap, and back portions and a retractor for restraining an occupant.

Loading tests have been conducted upon the vehicle seat system, and it withstood the forces to which it was exposed without any appreciable deformation or failure of its components. More specifically, the vehicle seat system withstood forces of about 3,600 pounds applied to the shoulder belt and lap belt portions of the seat belt. Thus, the vehicle seat system complied with the pull test requirements of FMVSS 571.207, section 4.2(c) in effect on Oct. 1, 2004, and supported an upper load in excess of 3,000 pounds applied to the shoulder portion of the integral passenger restrain system and a seat mass load of 20 times the mass of the seat multiplied by 9.8 applied through a center of gravity of the seat, both upper load and the seat mass load being simultaneously held for a duration of 10 seconds. The vehicle seat system retained its integrity when simultaneously supporting upper loads and seat mass loads equal to 120 percent of the pull test requirements of section 4.2(c).

Further, by anchoring the seat belt assembly to the seat (60), the seat belt assembly shifts in conjunction with the seat (60), thereby reducing friction arising from different seating positions and orientations and increasing the comfort of the occupant. In addition, the seat belt assembly can be oriented to better fit the occupant than a seat belt assembly anchored to the vehicle frame, thereby potentially reducing the risk of certain injuries.

The foregoing relates to a preferred exemplary embodiment of the invention. It is understood that other embodiments and variants are possible which lie within the spirit and scope of the invention as set forth in the following claims.

We claim:

1. A vehicle seat system comprising:
   a seat assembly having a seat portion and a backrest portion;
   a lower base frame for mounting to a vehicle and having a first forward portion and a first rearward portion;
   an upper base frame for mounting to the seat assembly and having a second forward portion and a second rearward portion;
   a linking system for interconnecting the upper base frame to the lower base frame, the upper frame being moveable relative to the lower frame, wherein the linking system provides a pedestal type arrangement having a height adjustment mechanism allowing selective upward and downward movement of the seat;
   an integral passenger restraint system associated with the seat assembly; and
   a stop operating at the first forward portion and second forward portion to limit forward pivoting movement of the seat assembly upon loads applied to the seat assembly above a predetermined level.

2. The vehicle seat system of claim 1, wherein the stop includes at least one tube at one of the first forward portion and the second forward portion.

3. The vehicle seat system of claim 2, wherein the at least one tube includes a first tube and a second tube, and the first tube and the second tube being telescopically engaged with one another.

4. The vehicle seat system of claim 3, wherein one of the first tube and the second tube engage one another to limit forward pivoting movement of the seat assembly upon loads applied to the seat assembly above a predetermined level.

5. The vehicle seat system of claim 4, wherein the first tube extends from the second forward portion of the upper base frame and the second tube extends from the first forward portion of the lower base frame.

6. The vehicle seat system of claim 5, wherein the first tube is received at least in part in the second tube.

7. The vehicle seat system of claim 6, wherein the first tube binds up in the second tube to limit forward pivoting movement of the seat assembly upon loads applied to the seat assembly above a predetermined level.

8. The vehicle seat system of claim 4, wherein the height adjustment mechanism includes a third tube and a fourth tube, and the third and fourth tubes being telescopically engaged with one another.

9. The vehicle seat system of claim 8, wherein the third tube extends from the upper base frame and the fourth tube extends from the lower base frame.

10. The vehicle seat system of claim 9, wherein a pin interconnects the third and fourth tubes to prevent relative movement therebetween.

11. The vehicle seat system of claim 10, wherein the third tube defines a series of holes to receive the pin to adjust the height of the seat assembly.

12. The vehicle seat system of claim 11, wherein the fourth tube defines at least one hole that can be aligned with any of the holes of the series of holes of the third tube to allow the pin to extend therethrough to prevent relative movement between the third tube and the fourth tube.

13. The vehicle seat system of claim 12, wherein the third tube is received at least in part in the fourth tube.

14. The vehicle seat system of claim 8, wherein at least one of the third tube and the fourth tube is reinforced at least at one end.

15. The vehicle seat system of claim 14, wherein one of the third tube and the fourth tube is thicker walled than the other.

16. The vehicle seat system of claim 15, wherein the height adjustment mechanism includes at least one collar about one end of the fourth tube to reinforce the end of the tube.

17. The vehicle seat system of claim 16, wherein the third tube includes a wall thickness greater than the fourth tube.

18. The vehicle seat system of claim 8, wherein the height adjustment mechanism includes a spring to bias the third and fourth tubes apart from one another.

19. The vehicle seat system of claim 18, wherein the third tube is received at least in part in the fourth tube, and the spring being disposed between the lower base frame and the upper base frame to bias the third tube outward from the fourth tube.

20. The vehicle seat system of claim 19, further comprising a locking mechanism extending through the fourth tube to engage the third tube to provide additional stability.

21. The vehicle seat system of claim 18, wherein the system retains its integrity when simultaneously supporting upper loads and seat mass loads equal to 120 percent of pull test requirements of Federal Motor Vehicle Safety Standard 571.207, section 4.2(c) in effect on Oct. 1, 2004.

* * * * *